(12) United States Patent
Anderson et al.

(10) Patent No.: US 6,307,705 B1
(45) Date of Patent: Oct. 23, 2001

(54) METHOD AND APPARATUS FOR REDUCING TRACK SWITCH LATENCY IN A DISK DRIVE

(76) Inventors: Clark Alan Anderson, 2421 60th St. NW., Rochester, MN (US) 55901; Todd Barry Anderson, 151 River Ct. NE.; Gerald Lawrence Cadloni, 1423 Northern Heights Dr., both of Rochester, MN (US) 55906; Earl Albert Cunningham, 2429 13th Ave. NW., Rochester, MN (US) 55901; Michael Scott Hicken, 1580 8 1/2 St. NE, Rochester, MN (US) 55904; Daniel Donald Reno, 721 30th St. NE, Rochester, MN (US) 55906; John Jeffrey Stephenson, 1323 28th St. SW., Rochester, MN (US) 55902

( * ) Notice: Subject to any disclaimer, the term of this patent is extended or adjusted under 35 U.S.C. 154(b) by 0 days.

(21) Appl. No.: 08/084,337

(22) Filed: Jun. 28, 1993

Related U.S. Application Data

(63) Continuation of application No. 07/786,475, filed on Nov. 1, 1991, now abandoned.

(51) Int. Cl.[7] .................................................. G11B 5/55
(52) U.S. Cl. ......................................... 360/78.04; 360/61
(58) Field of Search .............................. 360/78.14, 78.04, 360/97.03, 61

(56) References Cited

U.S. PATENT DOCUMENTS

| | | | |
|---|---|---|---|
| 3,825,951 | * 7/1974 | Katsumori et al. | 360/97.03 |
| 4,250,528 | * 2/1981 | Oda | 360/97.03 |
| 4,270,154 | * 5/1981 | Crawford . | |
| 4,396,961 | * 8/1983 | Prasad et al. | 360/78.04 |
| 4,887,254 | * 12/1989 | Nakatsu et al. . | |
| 4,931,888 | 6/1990 | Tagachi et al. | 360/77.04 |
| 5,021,898 | * 6/1991 | Sakai et al. | 360/78.04 |
| 5,150,266 | * 9/1992 | Albert | 360/78.04 |

FOREIGN PATENT DOCUMENTS 63-129501   1/1988   (JP) .

* cited by examiner

Primary Examiner—Aristotelis M. Psitos
Assistant Examiner—James L Habermehl

(57) ABSTRACT

In a ultra high density, multiple-disk drive, track switches within a cylinder of tracks as well as track switches to tracks on other cylinders both require a movement of the head stack actuator. Track switching latency in such a disk drive is reduced by overlapping pre-movement portions of the track switching process with the data transfer operation of the currently active recording head. In addition, post-movement portions of the track switching process are overlapped with the movement of the heads so that the next selected read/write head may begin a data transfer operation immediately upon arrival at the next track. Further, the pre-movement and post-movement portions of the track-switch process may be overlapped with low displacement movement of the read/write heads relative to the currently active track or the next track.

41 Claims, 7 Drawing Sheets

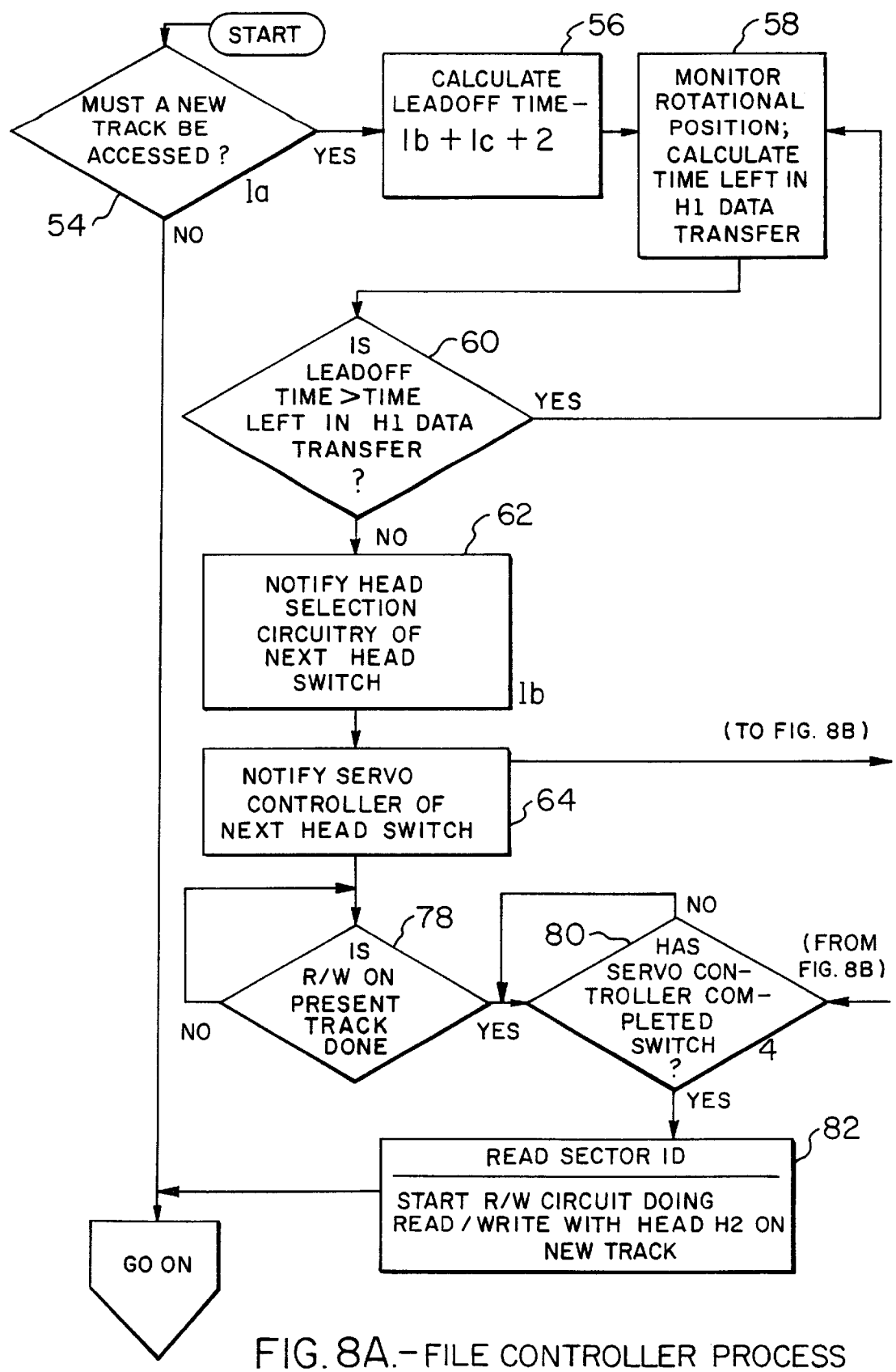
FIG. 8A.—FILE CONTROLLER PROCESS

FIG. 8B. SERVO CONTROLLER PROCESS

METHOD AND APPARATUS FOR REDUCING TRACK SWITCH LATENCY IN A DISK DRIVE

This is a Continuation of application Ser. No. 07/786,475 filed Nov. 1, 1991 now abandoned.

BACKGROUND OF THE INVENTION

1. Field of the Invention

This invention is directed to a method and apparatus for improving the performance of disk drive recording systems. In particular this invention is directed to reducing the delay between successive read/write operations caused by the necessity of moving the recording head from a current track to the track for the next read/write operation. This delay is referred to as track switching latency.

2. Description of Prior Art

In the past track switching latency has been dealt with in a limited way by making use of two or more recording head actuators distributed about the recording disk circumference. So long as the next read/write operation used a recording head on an actuator other than the currently active actuator, the next recording actuator could be moving the head to the correct track position while the first head finishes the current read/write operation.

One example of the above multiple actuator technique is taught in U.S. Pat. No. 4,270,154 issued to John E. Crawford. The Crawford patent is directed to overlapping the operation of one read/write head actuator with a second read/write head actuator so as to reduce system latency between read/write operations. In particular Crawford teaches algorithms for selecting the recording head and actuator for the next read/write operation so as to reduce latency. One of Crawford's algorithms evaluates the possibility of selecting a head on the inactive actuator so that the actuator may be moved to the next desired track or cylinder while the current read/write operation by the active actuator is being completed. Crawford recognizes the limitation of his design in that if the best head for the next recording operation is on the active actuator then it is not possible with Crawford's technique to reduce track switching latency.

In other words, Crawford has no solution for the problem of reducing track switching latency when only one read/write head actuator is used or when in a multiple actuator disk drive, the track switching is between heads on the same actuator. Unfortunately, most track switching in an optimized storage routine is track switching between tracks on the same cylinder; i.e., between heads on the same actuator.

Track switching between tracks on the same cylinder is no longer simply a matter of selecting another head in a single stack of heads on the same actuator. As track density has increased, thermal expansion and other mechanical characteristics of the disk drive result in different alignment positions for each head in a stack with its corresponding track. Therefore, the head actuator carrying the stack of heads must be moved when track switching occurs even between tracks in the same cylinder. In other words, what in the past might have been simply a head selection operation to switch between tracks on the same cylinder now requires actuation of the head actuator to move the new head into proper alignment with the new track in the same cylinder.

SUMMARY OF THE INVENTION

In accordance with this invention, the problems in the prior art have been solved by overlapping pre-movement portions of the track switching process with the data transfer operation of the currently active recording head. As another feature of the invention, additional post-movement portions of the track switching process are overlapped with the movement of the stack of heads so that the new recording head may begin a data transfer operation immediately upon arrival at the new track. As another feature of the invention, the pre-movement and post-movement portions are overlapped with low displacement portions of the head actuator movement. Thus in optimum configuration, a currently active data transfer could extend into the beginning of movement of a first head away from the present track but while it is still on that track. Further, data transfer at the next track could begin as soon as the next head arrives at the next track and while the head is still settling into alignment with the new track.

BRIEF DESCRIPTION OF THE DRAWINGS

Other objects, advantages and features of the invention will be understood by those of ordinary skill in the art after referring to the complete written description of the preferred embodiments in conjunction with the following drawings.

FIG. 8A shows the process flow for the program operating the file controller in the preferred embodiment of the invention.

FIG. 8B shows the process flow for the program operating the servo controller in the preferred embodiment of the invention.

DESCRIPTION OF THE PREFERRED EMBODIMENTS

Figure 1:
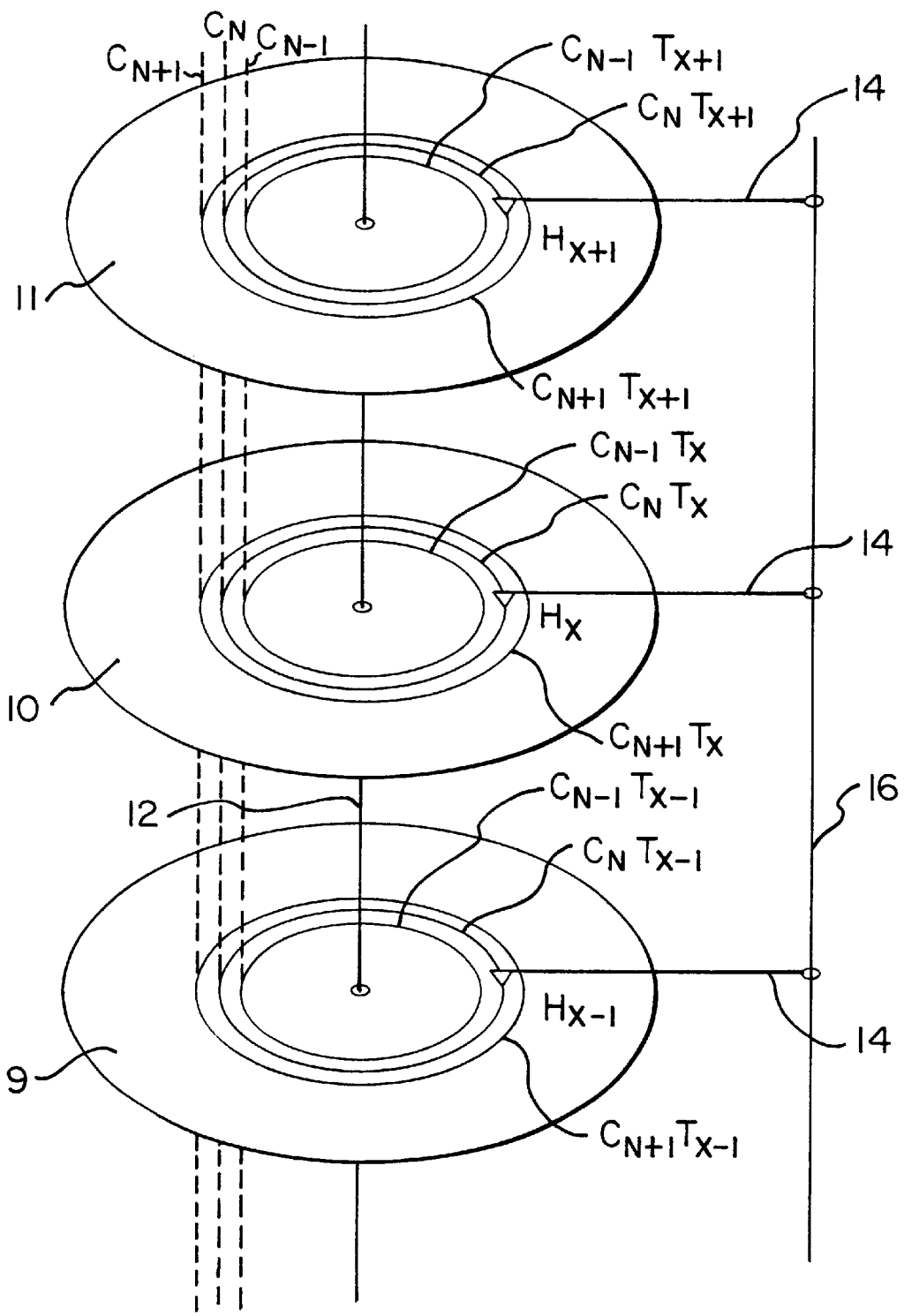
FIG. 1 is a schematic diagram of a stack of three recording disks and a stack of three recording heads on a single actuator arm or comb.

FIG. 1 schematically illustrates a typical magnetic recording environment where magnetic disks 9, 10 and 11 are stacked on and attached to a rotating spindle 12. Tracks "T" on the disks are accessed by recording or read/write heads "H" mounted on arms 14 attached to a single actuator frame 16. The actuator frame 16 with the arms 14 attached to it is sometimes referred to as a comb. For simplicity, the schematic illustration has only one head per disk. In most disk drives both sides of each disk will have a recording surface and there will be two heads per disk—one head on each side of the disk.

In FIG. 1, read/write heads, $H_{X-1}$, $H_X$, and $H_{X+1}$, read or write data on tracks, $T_{X-1}$, $T_X$, $T_{X+1}$, respectively. In this convention successive tracks are on the same cylinder rather than on the same disk. A cylinder is a collection of tracks (one track per disk as shown) at substantially the same radius on each disk. Thus $T_{X-1}$, $T_X$, and $T_{X+1}$ are referred to as a cylinder, and there are as many cylinders as there are tracks on a disk. There are three cylinders, $C_{N-1}$, $C_N$, $C_{N+1}$, illustrated in FIG. 1. There are as many tracks in a cylinder as there are heads in the stack of heads that record on the disks. To specify a single track requires both a cylinder address and a track address. For example, Track $C_{N+1}T_{X-1}$ in FIG. 1 is outermost track shown on the lower disk.

For optimum data transfer, data transfer routines in the operating system of the computer using the disk drive would store data on successive tracks in a cylinder until the cylinder is full. When the cylinder is full the routine would then switch to the next adjacent cylinder and continue through tracks in that cylinder until the storage operation is complete.

Thus, in the past a track switch to an adjacent track in a cylinder was simply just switching heads in the stack of heads. However, with very high density recording the mechanical variances between the head arms and the disks result in the necessity of moving the stack of heads to align the next head with the next track even when the tracks are in the same cylinder. In other words, track switching within a cylinder requires the complete track switch process and not simply a new head selection. Of course track switching to an adjacent cylinder requires the complete track switch process as well.

To allow for track switching time, successive sectors in adjacent tracks are skewed in position relative to each other. In other words if sector 1 is the last sector operated on before the track switch, after the track switch to an adjacent track the new head will be positioned to operate on sector 2 in the adjacent track. In the preferred embodiment of the invention a skew of two sectors is all that is required to allow for adjacent track switching and maintain successive sector addresses.

Figure 2:
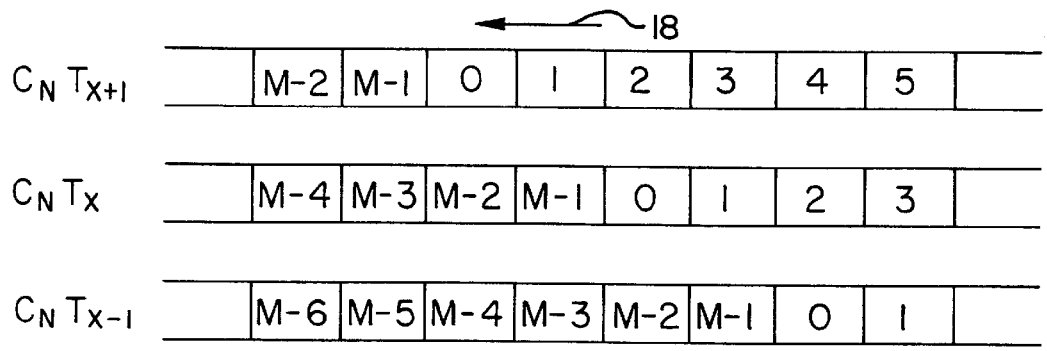
FIG. 2 shows the relative position of recorded sectors in adjacent tracks in a cylinder. This recording format illustrates a "head skew" or "track skew" of two sectors per track.

FIG. 2 shows the skew between sectors in adjacent tracks in the same cylinder $C_N$ of FIG. 1. Tracks $C_NT_{X-1}, C_NT_X$ and $C_NT_{X-1}$ are on disks 9, 10 and 11 respectively. Relative to heads $H_X+1$, $H_X$ and $H_X-1$ the tracks are moving in the direction of arrow 18. With this head skew, head $H_X$ would be in position to read/write on sector "1" in track $C_NT_X$ after head $H_{X-1}$ has finished a read/write operation on sector "0" in track $C_NT_{X+1}$ and a track switch from track $C_NT_{X+1}$ to track $C_NT_X$ has occurred.

Figure 3:
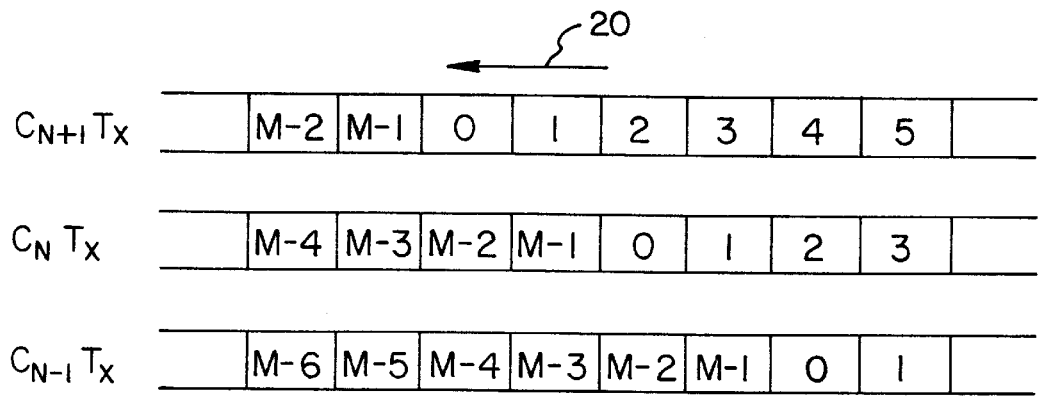
FIG. 3 shows the relative position of recorded sectors in adjacent tracks on a disk. This recording format illustrates a "cylinder skew" of two sectors per track.

FIG. 3 shows the skew between sectors in adjacent tracks on the same disk 10 of FIG. 1. Tracks $C_{N+1}T_X$, $C_NT_X$ and $C_{N-1}T_X$ are on cylinders $C_{N+1}$, $C_N$, and $C_{N-1}$ respectively. Relative to head $H_X$ the tracks are moving in the direction of arrow 20. With this cylinder skew, head $H_X$ would be in position to read/write on sector "1" in track $C_NT_X$ after it has finished a read/write operation on sector "0" in track $C_{N+1}T_X$ and a track switch from track $C_{N+1}T_X$ to track $C_NT_X$ has occurred.

Figure 4:
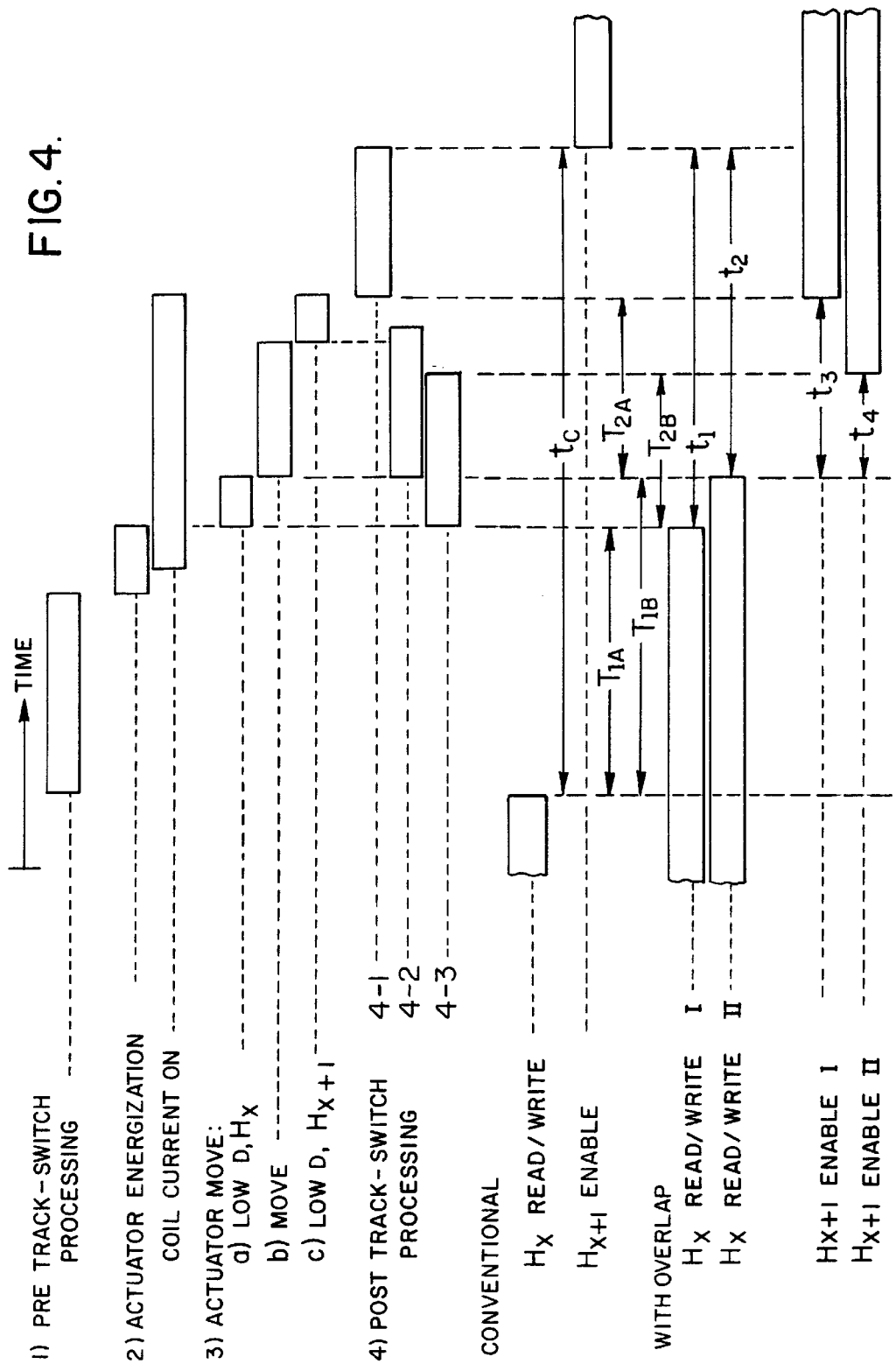
FIG. 4 is a timing diagram illustrating the overlaps, accomplished by the invention, between data transfer and various portions of the track switching process.

With this background on the sector and track locations on the disk, reference is now made to FIG. 4 to illustrate the timing in a conventional system and the timing in various preferred embodiments of the invention. As shown in FIG. 4 the track switch process can be divided into four phases— 1) Pre Track-Switch Processing, 2) Actuator Energization, 3) Actuator Move, and 4) Post Track-Switch Processing. Pre track-switch processing includes these events—a) determining that a track switch is necessary and the destination track, b) notifying the servo system for the comb actuator of the track switch and c) calculation of the actuator coil current drive to accomplish the move.

Figure 5:
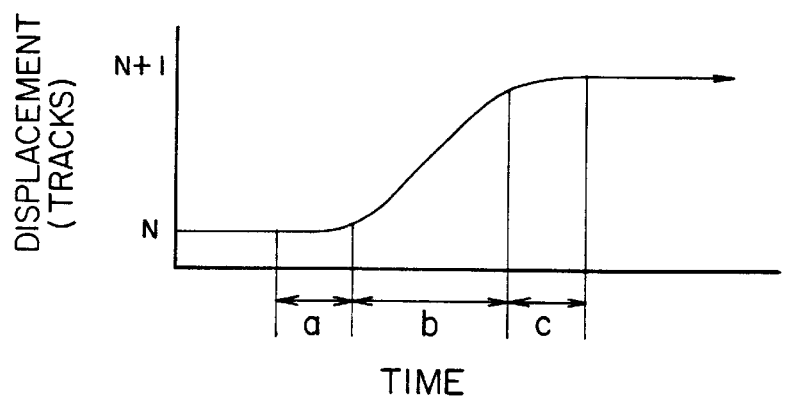
FIG. 5 is a displacement/time graph illustrative of a typical track switch.

The movement of the comb carrying the stack of heads involves phases 2) and 3) in the switch process. Actuator energization (phase 2) is simply the time to signal the actuator coil driver, start the flow of current from the driver to the actuator coil, and build up enough magnetic energy in the actuator to physically move the comb carrying the stack of heads. The actuator and the heads do not move during phase 2. In phase 3, the actuator and thus the comb and stack of heads move. A time/displacement diagram of the movement is shown in FIG. 5. As depicted there, the actuator movement is split into three event time intervals—a) low displacement relative to the current track, b) movement between tracks, and c) low displacement relative to the next or new track.

The last phase (phase 4) of the track switch process is post track-switch processing and includes notifying the file controller that the switch is complete and enabling the selected head to begin looking for the sector ID in the new track.

The length of the horizontal bars in FIG. 4 represent the duration of the phases or events in the track-switch process and the horizontal location of the bars indicates the relative timing to the other phases of the process. The timing bars 4-1, 4-2, and 4-3, for phase 4 are not events within phase 4 but instead are time locations for phase 4 and thus alternate embodiments of the invention as will be explained shortly. In the lower half of FIG. 4 the timing bars for heads $H_X$ and $H_{X-1}$ represent periods of time when the heads are enabled to read or write. The time interval between the end of the $H_X$ bars and the beginning of the $H_{X+1}$ bars illustrates track switching latency.

In FIG. 4 conventional track switching with no overlap, head $H_X$ Read/Write completes at the start of phase 1. Head $H_{X+1}$ Enable does not occur until the end of phase 4. Further, phase 4 is sequential to phase 3 (Phase 4-1 in FIG. 4), and therefore, the track switch latency is $t_c$ in FIG. 4.

In one preferred embodiment of the invention the pre track-switch process and the actuator energization phases are overlapped with the read/write operation of the current head $H_X$ (see $H_X$ Read/Write I in FIG. 4). This embodiment reduces the track-switch latency from $t_c$ to $t_1$, about half of the conventional latency. In another preferred embodiment of the invention, this overlap is extended to include first event in phase 3; i.e. event 3a, the low displacement of the head relative to the currently active track. This embodiment reduces the track-switch latency to $t_2$ (FIG. 4).

Further reduction in track-switch latency can be achieved by overlapping the post track-switch phase with the actuator movement phase. This will permit earlier enablement of the read/write operation by the new head on the new track. In the embodiment phase 4-2 in FIG. 4, phase 4 begins at the end of event 3a. Phase 4 then completes before the end of phase 3, and head $H_{X+1}$ Enable I begins at the end of phase 3. As a result, the track switch latency is shortened to $t_3$.

In another preferred embodiment phase 4-3 in FIG. 4, the track-switch latency is further shortened by beginning the post track-switch process at the start of phase 3. This allows the post track-switch process (phase 4) to complete before the end of event 3b which is the high displacement of the head off track. New head enable, $H_{X+1}$ Enable II (FIG. 4), begins as soon as phase 4-3 completes. In other words near the end event 3b and just before the head is starting into low-displacement (event 3c) relative to the new track, head $H_{X+1}$ is enabled to look for sector ID's in the new track. Head $H_{X+1}$ will not begin a data transfer until after a sector ID is successfully read. This protects data transfer operations from beginning before the new head is indeed on track at the new track. The result is that the track-switch latency is shortened to $t_4$.

It will be appreciated that various trade-offs and overlapping portions of the track-switch process with the enablement of the old and new heads can be made. One consideration in overlapping into low-displacement events 3a and 3c is the ability of the recording system to tolerate slight misregistrations. In the embodiments of the invention overlapping into events 3a and 3c, a head to track misregistration of 5% has been deemed acceptable. However, the amount of misregistration that can be tolerated is a matter of design choice.

Figure 6:
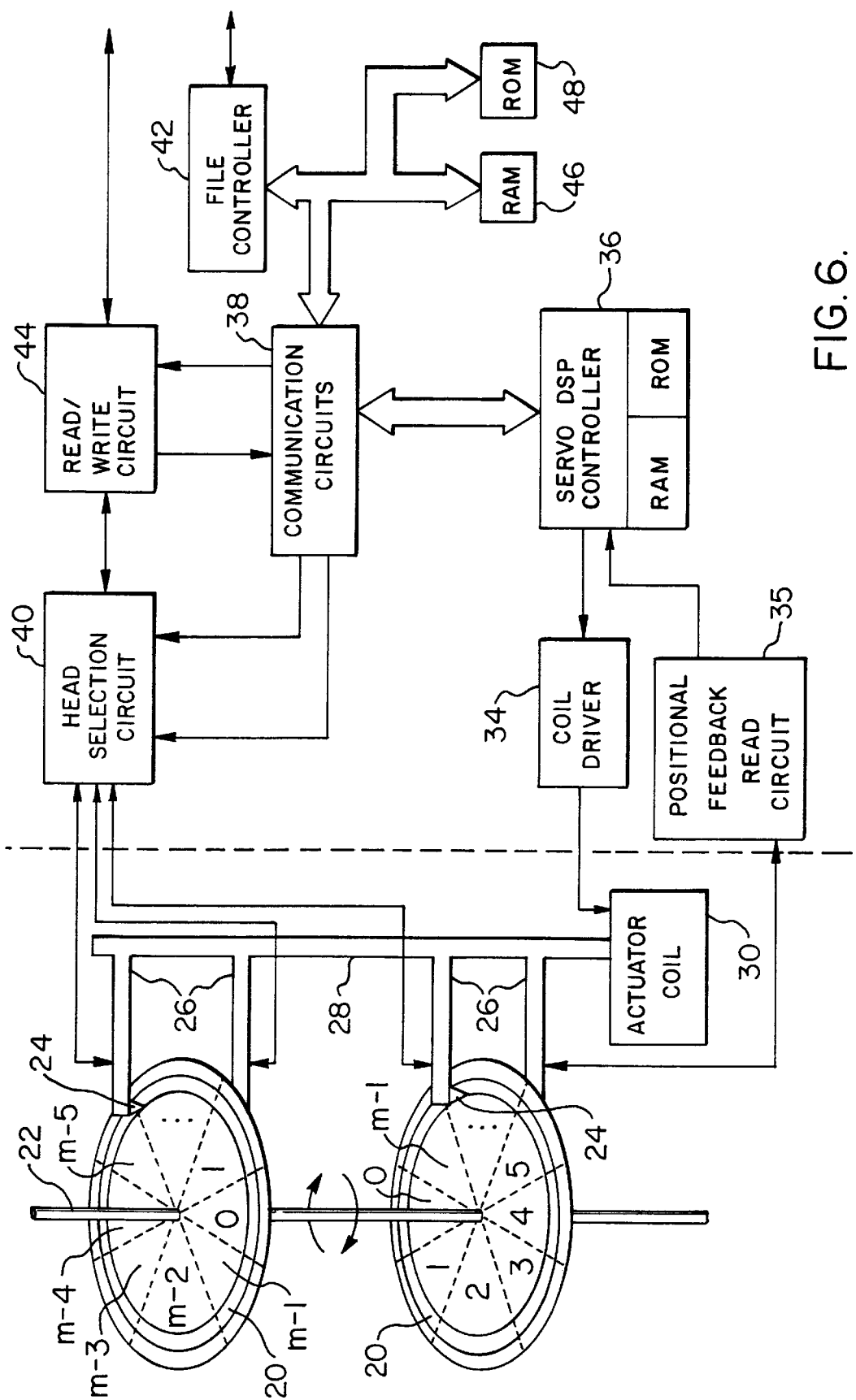
FIG. 6 shows a preferred embodiment of the invention wherein a file controller and servo controller cooperate to accomplish the inventive overlap.

The apparatus used to implement the various embodiments of the invention is shown in FIG. 6. Disks 20 are attached to and rotate with spindle 22. Heads 24 are carried by arms 26 of comb actuator 28. There are two heads per disk, one on each side of the disk. Actuator 28 is moved by actuator coil 30.

The current to drive the actuator coil comes from coil driver 34. This driver is controlled by the servo controller 36. Positional information from servo tracks on a servo dedicated disk is read by a servo read head, the lowermost head in FIG. 6. From the servo head the positional feedback read circuits 35 digitize the positional information and supply it to the servo controller 36. Servo controller 36 is a digital signal processor module; the module also carries the RAM and ROM memories used by the processor. The function of the servo controller 36 is to control the coil current to the actuator to move the new head into alignment with the new track and to notify the head selection circuits when to switch heads.

Servo controller 36 controls the timing for switching heads from the old head to the new head but not the selection of the heads per se. The switch control from the servo controller 36 is passed through the communication circuits 38 shown in FIG. 7 to the head selection circuits 40. The switch control word is sent over the servo controller microprocessor bus to the switch control register 39 in FIG. 7.

Head selection is done by file controller 42 which sends the head identification number of the new head over file controller micro-processor bus to head ID register 43 (FIG. 7) in the communication circuits 38 to the selection circuits 40.

Figure 7:
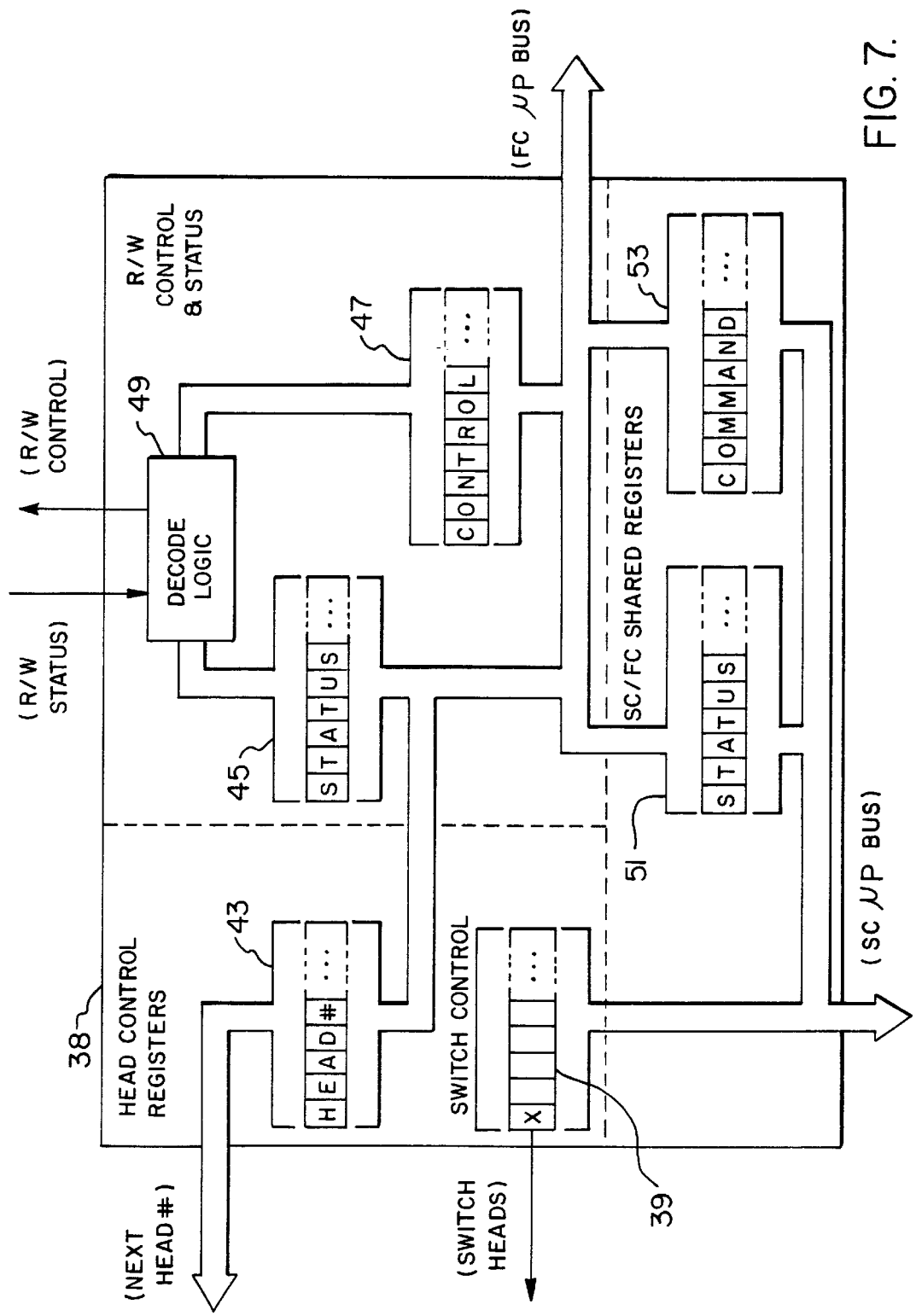
FIG. 7 is a detail of the communication circuits in FIG. 6.

File controller 42 is a microprocessor that uses RAM 46 and ROM 48 to perform its program process. The flow of the process is described later with reference to FIG. 8A. The function of the file controller is to determine when a track switch is necessary, identify the next or new head and notify the servo controller 36 of the impending track switch. The file controller also controls read/write circuits 44 through communication circuits 38. In FIG. 7, the read/write control commands from file controller 42 are sent over the file controller microprocessor bus to the control register 47 in the communication circuits. Decode logic 49 decodes the control commands and status words and passes status information and control signals to the read/write circuits 44 (FIG. 6).

As shown in FIG. 7, the file controller 42 and servo controller 36 are trading status and commands through the status register 51 and command register 53 in the communication circuits 38. The function of this status and command information will be apparent as the process flow in FIGS. 8A and 8B is described.

FIGS. 8A and 8B show the process flow for one preferred embodiment of the invention. The process flow of the file controller 42 is shown in FIG. 8A, and the process flow of the servo controller 36 is shown in FIG. 8B. The process begins at decision block 54 where the file controller has determined that a track switch is necessary. Process steps 56, 58, and 60 anticipate the end time of the present read/write operation and start the head selection process and actuator energization process at a time such that the read/write will complete just prior to movement of head away from the present track. This anticipation time or leadoff time is time $T_{1A}$ or $T_{1B}$ in FIG. 4. Time $T_{1A}$ overlaps processing and energization with read/write up to the start of movement by the head. Time $T_{1B}$ continues the overlap through low displacement movement of the head as it finishes the read/write operation. In this latter embodiment step 56 would calculate a leadoff time=1b+1c+2+3a.

In step 56, the anticipation or leadoff time is calculated from a table of stored values for each one of the events or phases in the leadoff equation. These values are predetermined by experimentation and testing and loaded into a table in ROM 48 (FIG. 6). The table of phases and events for which duration intervals are stored would be as follows:

1) Pre Track-Switch Processing
   1b) notification of servo system to perform track switch;
   1c) calculation of actuator coil current;
2) Actuator Energization (apply coil current);
3) Actuator Move
   3a) low displacement move in present track;
   3b) high displacement move between tracks;
   3c) low displacement move in new track;
4) Post Track-Switch Processing.

The duration intervals stored would depend on the system and thus must be experimentally determined.

The phases and events listed above are associated with process steps in FIGS. 8A and 8B and are identified therein with the same phase or event number beside the process step.

In step 58, the file controller receives rotational position feedback information from the status register 45 and calculates the time to end of track from the rotational position and speed of rotation. Decision block 60 then releases the process flow to continue the track switch process once it knows the leadoff or anticipation time is greater than the time to end of track.

Step 62 notifies the head selection circuitry 40 (FIG. 6) of which head to switch to. The head selection circuitry stores this information but does not make the switch to the new head yet. Step 64 notifies the servo controller 36 of the switch to a new head and thus new track. This notification is by a command passed through the command register 53 (FIG. 7) in the communication circuits 38.

Servo controller 36 receives the track-switch command from the file controller and at step 66 calculates the actuator coil current profile to accomplish the movement of the new head to the new track. When the coil current profile is determined, step 68 starts the application of current to the actuator coil by notifying coil driver 34 (FIG. 6). The signal to the coil driver is a pulse-width modulated signal which is decoded by the driver into a coil current. Steps 66 and 68 correspond to event 1c in phase 1 of the overall process.

Decision block 70 then times out phase 2 and event 3a to be sure that the read/write operation has been completed before step 72 tells the head selection circuits to change heads. Step 72 is the beginning of phase 4. Then step 76 sends a status word back to the file controller to notify it that the servo operation has been completed.

Meanwhile in the file controller, decision block 78 monitors the end of the read/write operation at the present (old) track. When it detects the end of the read/write operation, process flow passes to decision block 80 which is looking for servo complete status from the servo controller. When servo complete is received, decision 80 passes control to step 82 which enables the new head to start looking for the sector ID on the new track. As soon as the new sector ID is picked up, the read/write operation begins on the new track.

Figure 8C:
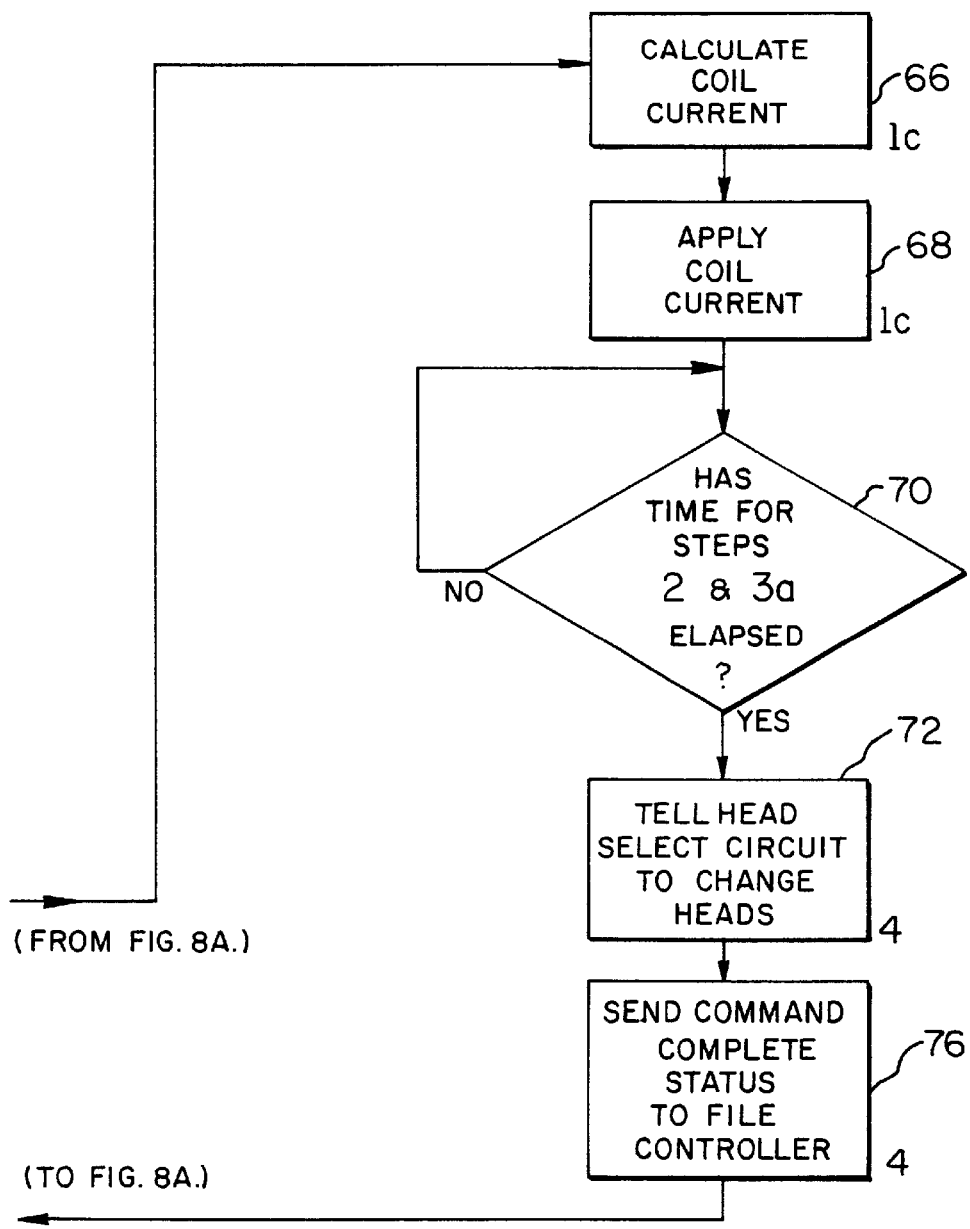
FIG. 8C shows a decision block in the process flow in one of the alternative embodiments of the invention.
Figure 8C:
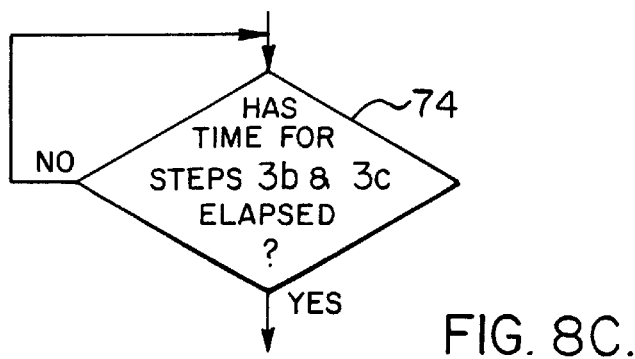

The embodiment shown in FIG. 8A relies on the requirement of the new head reading sector ID to prevent premature activation of a data transfer. In an alternative embodiment decision block 74 shown in FIG. 8C is inserted after decision block 80 and before step 82. Decision block 74 times out events 3b and 3c to be sure the new head is on the the new track. After time for events 3B and 3C has elapsed, decision 74 passes control to step 82 which enables the new head to start looking for the sector ID on the new track. This embodiment does not use as much overlap of the post track switch process with actuator movement, but it does insure the new head is on the new track before the head is enabled.

The timeout function of decision block 70 controls the extent to which overlap may occur between post track-switch processing and the movement of the head actuator. This second anticipation interval or closing time is anticipating the landing or closing time of the new head on the new track and therefore the earliest time for enabling the new head.

Where post track-switch processing begins after event 3a of the movement (as described for decision block 70), and events 3b and 3c are timed out before the new head is enabled (as described for decision block 74 in FIG. 8C), the closing time is interval $T_{2A}$ in FIG. 4. The timeout function of decision block 74 guarantees that actuator movement is complete.

However in the preferred embodiment of FIG. 8A where there is no decision block 74 and by changing decision block 70 to timeout for event 2 only, the closing time may be shortened to interval $T_{2B}$ in FIG. 4. In this embodiment, the new head is enabled as soon as phase 4 is completed. This occurs during phase 3 near the end of event 3b, high displacement move. This embodiment relies on the reading of sector ID to trigger a data transfer as discussed earlier.

While a number of preferred embodiments of the invention have been shown and described, it will be appreciated by one skilled in the art, that a number of further variations or modifications may be made without departing from the spirit and scope of our invention.

What is claimed is:

1. Method for reducing track-switch latency between data transfer operations on a present track and a new track in a disk drive when said present track and said new track are operated on by a currently active head for said present track and a next selected head for a new track, said active and next heads being mounted on a single head arm actuator, said method comprising the steps of:
   determining time remaining for said active head to reach end of track at said present track;
   determining a leadoff interval necessary to complete a pre track-switch processing step and a head arm actuator energizing step;
   detecting when said leadoff interval is greater than said time remaining to said end of track;
   performing pre track-switch processing in response to said detecting step; and
   energizing said head arm actuator in response to said detecting step to build energy in said head arm actuator during said leadoff interval whereby said currently active head completes data transfer at said present track prior to movement of said active head off said present track.

2. The method of claim 1 wherein said pre track-switch processing step comprises the steps of:
   determining said next head to be selected for said new track; and
   determining an energy profile for said head arm actuator for use in moving said actuator from said present track to said new track.

3. The method of claim 2 and in addition:
   moving said head arm actuator a low displacement distance relative to said present track during said leadoff interval, said low displacement distance movement of said active head is small enough for said active head to remain on-track with said present track; and
   preventing the selection of said next head until after said low displacement moving step whereby said next head is not selected until said currently active head has moved off said present track.

4. The method of claim 3 and in addition:
   moving said head arm actuator to move said next selected head to said new track;
   anticipating a closing time interval of said next selected head closing on said new track; and
   post track switch processing during said closing time interval.

5. The method of claim 4 wherein said closing time interval anticipating step comprises the step of:
   determining a time interval to complete head arm actuator movement.

6. The method of claim 5 wherein said post track-switch processing step comprises the steps of:
   switching head selection circuits to said next selected head; and
   enabling said next selected head to read.

7. The method of claim 4 wherein said closing time interval anticipating step comprises the step of:
   determining a time interval to complete a high displacement head arm actuator movement.

8. The method of claim 1 and in addition:
   moving said head arm actuator to carry said next selected head to said new track;
   anticipating a closing time of said next selected head closing on said new track; and
   post track switch processing during said closing time.

9. The method of claim 8 wherein said closing time anticipating step comprises the step of:
   determining a time interval to complete head arm actuator movement.

10. The method of claim 9 wherein said post track switch processing step comprises the steps of:
    switching head selection circuits to said next selected head; and
    enabling said next selected head to read.

11. Method of claim 10 wherein said pre track-switch processing step comprises the steps of:
    determining said next selected head for said new track; and
    determining an energy profile for said head arm actuator for use in moving said actuator from said present track to said new track.

12. Apparatus for reducing track switching latency in a disk drive where track switching involves selecting among a number of read/write heads on a single head arm actuator, said latency reducing apparatus comprising:

means for calculating time remaining until an end of data transfer between a read/write head and a present track;

means for calculating a leadoff time interval corresponding to the time required to complete track-switch preparations by a track-switch preparation means;

means for detecting when said leadoff interval is greater than said time remaining until said end of data transfer for said present track; and said track-switch preparation means responsive to said detecting means for starting track-switch preparations when said leadoff interval is greater than said time remaining.

13. The apparatus of claim 12 wherein said track-switch preparation means comprises:

means for selecting a next head to read a next track; and means for calculating an actuator coil current profile for said head arm actuator to move said next head to said next track.

14. The apparatus of claim 13 and in addition actuating means for moving said head arm actuator and wherein said track-switch preparation means further comprises:

means for applying said coil current to said actuating means in said head arm actuator to build energy in said actuating means to start movement of said actuator.

15. The apparatus of claim 14 wherein said actuating means is responsive to said applying means for displacing said actuator a small amount relative to alignment with said present track as said data transfer is being completed.

16. The apparatus of claim 12 and in addition:

means for anticipating an end of movement by said actuator;

head read/write circuits; and means for switching said head read/write circuits to said next head before said end of actuator movement.

17. The apparatus of claim 16 and in addition:

means for determining when actuator movement is complete; and means responsive to said determining means for enabling said next head after said actuator movement is complete.

18. The apparatus of claim 12 and in addition:

means for anticipating an end of actuator movement;

head read/write circuits; and means for switching said read/write circuits to a next head before said end of actuator movement.

19. The apparatus of claim 18 and in addition:

means for enabling said next head after said switching means has switched said read/write circuits to said next head.

20. Apparatus for reducing track switching latency in a disk drive when switching from a presently active read/write head on a present track to a next selected read/write head on a new track, the disk driving having a plurality of read/write heads on a head arm actuator, said apparatus comprising:

means for pre track-switch processing during a phase 1 time interval;

means for energizing said actuator during a phase 2 time interval to build up energy in said actuator prior to movement of said actuator;

said actuator in response to energization by said energizing means moving during a low-displacement phase 3a time interval to exit the present track;

means for accumulating one or more of the phase 1, 2 or 3a time intervals to determine a leadoff interval;

means for monitoring time remaining for the present active head to reach end of track on the present track;

means for comparing said leadoff interval to said time remaining; and means responsive to said comparing means for starting said pre track-switch processing means when said leadoff interval is greater than said time remaining.

21. The apparatus of claim 20 wherein the disk drive has a servo system for controlling actuator movement and said pre track-switch processing means comprises:

means for determining that a track-switch from the present track to a new track is required;

means for notifying during a phase 1b time interval the servo system of the switch from the present track to the new track;

means for calculating during a phase 1c time interval the energy profile for moving the actuator so that the next selected head is over the new track; and said accumulating means accumulates one or more of the intervals 1b, 1c, 2 or 3a to determine the leadoff time interval.

22. The apparatus of claim 21 and in addition:

said actuator moving during a high-displacement phase 3b time interval from the present track to the new track and moving during a low-displacement phase 3c interval to enter the new track;

post track-switch processing means for switching from the presently active head to the next selected head;

means for testing when phase 3a has elapsed; and said post track-switch processing means responsive to said testing means to switch to the next selected read/write head after phase 3a has elapsed.

23. The apparatus of claim 22 in addition:

said disk drive has read/write circuits;

said post track-switch processing means further includes means for notifying the disk drive read/write circuits that the switch to the next selected read/write head is complete;

means for testing when phases 3b and 3c have elapsed; and means for activating the read/write circuits for the next head after phases 3b and 3c have elapsed.

24. Apparatus for reducing track switching latency in a disk drive when switching from a presently active read/write head on a present track to a next selected read/write head on a new track, the disk driving having a plurality of read/write heads on a head arm actuator, said apparatus comprising:

means for pre track-switch processing during a phase 1 time interval;

means in response to completion of pre track-switch processing for energizing said actuator during a phase 2 time interval to build up energy in said actuator prior to movement of said actuator;

means for combining phase 1 and 2 time intervals to determine a leadoff interval indicating time required for pre track-switch processing and actuator energy build up;

means for monitoring time remaining for the present active head to reach end of track on the present track;

means for comparing said leadoff interval to said time remaining; and means responsive to said comparing means for starting said pre track-switch processing means when said leadoff interval is greater than said time remaining whereby said pre track-switch processing and actuator energy build up is overlapped with the end of the read/write operation by the presently active head on the present track.

25. The apparatus of claim 24 wherein the disk drive has a servo system for controlling actuator movement, and said pre track-switch processing means comprises:

means for determining that a track-switch from the present track to a new track is required;

means for notifying during a phase 1b time interval the servo system of the switch from the present track to the new track;

means for calculating during a phase 1c time interval the energy profile for moving the actuator so that the next selected head is over the new track; and said combining means combining intervals 1b, 1c and 2 to determine the leadoff time interval.

26. The apparatus of claim 25 and in addition:

said actuator moving in response to energization by said energizing means, said actuator moving during a low-displacement phase 3a time interval to exit the present track, during a high-displacement phase 3b time interval to move from the present track to the new track and during a low-displacement phase 3c interval to enter the new track;

post track-switch processing means for switching from the presently active head to the next selected head;

means for testing when phase 3a has elapsed; and said post track-switch processing means responsive to said testing means for switching to the next selected read/write head as the active head after phase 3a has elapsed, whereby said post track-switch processing is completed while said actuator is moving during phases 3b and 3c.

27. The apparatus of claim 26 in addition:

said disk drive has read/write circuits;

said post track-switch processing means further includes means for notifying the disk drive read/write circuits that the switch to the next selected read/write head is complete;

means for testing when phases 3b and 3c have elapsed; and means for activating the read/write circuits for the next head after phases 3b and 3c have elapsed.

28. The apparatus of claim 24 and in addition:

said actuator moving in response to energization by said energizing means, said actuator moving during a low-displacement phase 3a time interval to exit the present track, during a high-displacement phase 3b time interval to move from the present track to the new track and during a low-displacement phase 3c interval to enter the new track;

post track-switch processing means for switching from the presently active head to the next selected head;

means for testing when phase 3a has elapsed; and said post track-switch processing means responsive to said testing means for switching to the next selected read/write head as the active head after phase 3a has elapsed, whereby said post track-switch processing is completed while said actuator is moving during phases 3b and 3c.

29. The apparatus of claim 28 in addition:

said disk drive has read/write circuits;

said post track-switch processing means further includes means for notifying the disk drive read/write circuits that the switch to the next selected read/write head is complete;

means for testing when phases 3b and 3c have elapsed; and means for activating the read/write circuits for the next head after phases 3b and 3c have elapsed.

30. The apparatus of claim 24 and in addition:

said actuator in response to energization by said energizing means moving during a low-displacement phase 3a time interval to exit the present track; and said combining means combining intervals 1, 2 and 3a to determine the leadoff time interval.

31. In a disk drive having a plurality of read/write heads on a head arm actuator, a method for reducing track switching latency in the disk drive when switching from a presently active read/write head on a present track to a next selected read/write head on a new track, said method comprising the steps of:

pre track-switch processing during a phase 1 time interval;

energizing said actuator during a phase 2 time interval to build up energy in said actuator prior to movement of said actuator, said actuator in response to energization by said energizing step moving during a low-displacement phase 3a time interval to exit the present track;

accumulating one or more of the phase 1, 2 or 3a time intervals to determine a leadoff interval;

monitoring time remaining for the present active head to reach end of track on the present track;

comparing said leadoff interval to said time remaining; and starting said pre track-switch processing means when said leadoff interval is greater than said time remaining.

32. The method of claim 31 wherein the disk drive has a servo system for controlling actuator movement and said pre track-switch processing step comprises the steps of:

determining that a track-switch from the present track to a new track is required; notifying during a phase 1b time interval the servo system of the switch from the present track to the new track;

calculating during a phase 1c time interval the energy profile for moving the actuator so that the next selected head is over the new track; and said accumulating step accumulates one or more of the intervals 1b, 1c, 2 or 3a to determine the leadoff time interval.

33. The method of claim 32 and in addition:

said actuator moving during a high-displacement phase 3b time interval from the present track to the new track and moving during a low-displacement phase 3c interval to enter the new track;

means for testing when phase 3a has elapsed; and means responsive to said testing means for switching to the next selected read/write head as the active head after phase 3a has elapsed.

34. The method of claim 33, wherein said disk drive has read/write circuits, and in addition the steps of:

testing when phases 3b and 3c have elapsed; and activating the read/write circuits for the next head after phases 3b and 3c have elapsed.

35. In a disk drive having a plurality of read/write heads on a head arm actuator, a method for reducing track switching latency in a disk drive when switching from a presently active read/write head on a present track to a next selected read/write head on a new track, said method comprising the steps of:

pre track-switch processing during a phase 1 time interval;

after completion of pre track-switch processing step, energizing said actuator during a phase 2 time interval to build up energy in said actuator prior to movement of said actuator;

combining phase 1 and 2 time intervals to determine a leadoff interval indicating time required for pre track-switch processing and actuator energy build up;

monitoring time remaining for the present active head to reach end of track on the present track;

comparing said leadoff interval to said time remaining; and starting said pre track-switch processing means when said leadoff interval is greater than said time remaining whereby said pre track-switch processing and actuator energy build up is overlapped with the end of the read/write operation by the presently active head on the present track.

36. The method of claim 35, wherein the disk drive has a servo system for controlling actuator movement, and said pre track-switch processing step comprises the steps of:

determining that a track-switch from the present track to a new track is required;

notifying during a phase 1b time interval the servo system of the switch from the present track to the new track;

calculating during a phase 1c time interval the energy profile for moving the actuator so that the next selected head is over the new track; and said combining step combining intervals 1b, 1c and 2 to determine the leadoff time interval.

37. The method of claim 36 and in addition:

said actuator in response to energization by said energizing step moving during a low-displacement phase 3a time interval to exit the present track, moving during a high-displacement phase 3b time interval from the present track to the new track, and moving during a low-displacement phase 3c interval to enter the new track;

means for testing when phase 3a has elapsed; and switching to the next selected read/write head after phase 3a has elapsed, whereby the head switching is completed while said actuator is moving during phases 3b and 3c.

38. The method of claim 37, wherein said disk drive has read/write circuits, and in addition the steps of:

notifying the disk drive read/write circuits that said head switching step is complete;

testing when phases 3b and 3c have elapsed; and activating the read/write circuits after phases 3b and 3c have elapsed.

39. The method of claim 35 and in addition the steps of:

said actuator in response to energization by said energizing step moving during a low-displacement phase 3a time interval to exit the present track, moving during a high-displacement phase 3b time interval from the present track to the new track and moving during a low-displacement phase 3c interval to enter the new track;

means for testing when phase 3a has elapsed; and switching to the next selected read/write head after phase 3a has elapsed whereby the head switching is completed while said actuator is moving during phases 3b and 3c.

40. The method of claim 39, wherein the disk drive has read/write circuits, and in addition the steps of:

notifying the disk drive read/write circuits that the switch to the next selected read/write head is complete;

testing when phases 3b and 3c have elapsed; and activating the read/write circuits after phases 3b and 3c have elapsed.

41. The method of claim 35 and in addition:

said actuator in response to energization by said energizing step moving during a low-displacement phase 3a time interval to exit the present track; and combining intervals 1, 2 and 3a to determine the leadoff time interval.

* * * * *

UNITED STATES PATENT AND TRADEMARK OFFICE
CERTIFICATE OF CORRECTION

PATENT NO.     : 6,307,705 B1                                                Page 1 of 1
DATED          : October 23, 2001
INVENTOR(S)    : Clark Alan Anderson et al.

It is certified that error appears in the above-identified patent and that said Letters Patent is hereby corrected as shown below:

<u>Title page,</u>
After Item [75], Inventors, add the following item:
-- [73]   Assignee: International Business Machines Corporation, Armonk, NY --
Before Item [57], ABSTRACT, add the following:
-- *Attorney, Agent or Firm*—Homer L. Knearl; Francis A. Sirr; Holland & Hart --

Signed and Sealed this

Twelfth Day of November, 2002

Attest:

JAMES E. ROGAN
Attesting Officer          *Director of the United States Patent and Trademark Office*